(12) United States Patent
Lin et al.

(10) Patent No.: US 7,180,944 B2
(45) Date of Patent: Feb. 20, 2007

(54) LOW-COMPLEXITY SPATIAL DOWNSCALING VIDEO TRANSCODER AND METHOD THEREOF

(75) Inventors: Chia-Wen Lin, Chiayi (TW); Yuh-Ruey Lee, Chiayi (TW); Yeh-Kai Chou, Changhua Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 293 days.

(21) Appl. No.: 10/888,479

(22) Filed: Jul. 8, 2004

(65) Prior Publication Data

US 2005/0169377 A1 Aug. 4, 2005

(30) Foreign Application Priority Data

Feb. 4, 2004 (TW) .............................. 93102520 A

(51) Int. Cl.
*H04N 7/18* (2006.01)
(52) U.S. Cl. .................... 375/240.16; 375/240.25; 375/240.26
(58) Field of Classification Search .............................. 375/240.01–240.29
See application file for complete search history.

(56) References Cited

U.S. PATENT DOCUMENTS

| | | | |
|---|---|---|---|
| 5,537,440 A | 7/1996 | Eyuboglu et al. ............ 375/245 |
| 5,544,266 A | 8/1996 | Koppelmans et al. ....... 382/238 |
| 5,600,646 A | 2/1997 | Polomski .................... 370/263 |
| 5,657,015 A | 8/1997 | Nakajima et al. ............. 341/61 |
| 5,729,293 A | 3/1998 | Keesman ..................... 348/401 |
| 6,466,623 B1 | 10/2002 | Youn et al. ............ 375/240.16 |
| 6,490,320 B1 | 12/2002 | Vetro et al. ............ 375/240.08 |
| 6,542,546 B1 | 4/2003 | Vetro et al. ............ 375/240.12 |
| 6,584,077 B1 | 6/2003 | Polomski .................... 370/263 |
| 6,647,061 B1 * | 11/2003 | Panusopone et al. .. 375/240.12 |
| 6,868,188 B2 * | 3/2005 | Skodras et al. ............. 382/250 |

OTHER PUBLICATIONS

Tamer Shanableh and Mohammed Ghanbari, Senior Member,IEEE, "Heterogeneous Video Transcoding to Lower Spatio-Temporal Resolutions and Different Encoding Formats", IEEE Transactions on Multimedia, vol. 2, No. 2, Jun. 2000.

Anthony Vetro, Charilaos Christopoulos, and Huifang Sun, "Video Transcoding Architectures and Techniques: An Overview", IEEE Signal Processing Magazine, Mar. 2003.

Pedro A. A. Assunção and Mohammed Ghanbari, Senior Member, IEEE, "A Frequency-Domain Video Transcoder for Dynamic Bit-Rate Reduction of MPEG-2 Bit Streams", IEEE Transactions Circuits and Systems for Video Technology, vol. 8, No. 8, Dec. 1998.

(Continued)

*Primary Examiner*—Andy Rao

(57) ABSTRACT

A low-complexity spatial downscaling video transcoder and method thereof are disclosed. The transcoder comprises a decoder having a reduced DCT-MC unit, a DCT-domain downscaling unit, and an encoder. The decoder performs the DCT-MC operation at a reduced-resolution for P-/B-frames in an MPEG coded bit-stream. The DCT-domain downscaling unit is used for spatial downscaling in the DCT-domain. After the downscaling and the motion vectors re-sampling, the encoder determines the encoding modes and outputs the encoded bit-stream. Compared with the original CDDT, this invention can achieve significant computation reduction and speeds up the transcoder without any quality degradation.

17 Claims, 12 Drawing Sheets

OTHER PUBLICATIONS

Wenwu Zhu, Kyeong Ho Yang, and Marc J. Beacken, "CIF to QCIF Video Bitstream Down-Conversion in the DCT Domain", Bell Labs Technical Journal. Jul.-Sep. 1998.

Rakesh Dugad, Student Member, IEEE and Narendra Ahuja, Fellow, IEEE."A Fast Scheme for Image Size Change in the Compressed Domain", IEEE Transactions on Circuits and Systems for Video Technology, vol. 11, No. 4, Apr. 2001.

Peng Yin, Min Wu, and Bede Liu, "Video Transcoding by Reducing Spatial Resolution", Department of Electrical Engineering Princeton University, Princeton, Nj 08544, U.S.A.

Junehwa Song and Boon-Lock Yeo,"A Fast Algorithm for DCT-Domain Inverse Motion Compensation Based on Shared Information in a Macroblock", IEEE Transactions on Circuits and Systems for Video Technology, vol. 10, No. 5, Aug. 2000.

* cited by examiner ("Football")

| method \ experimental results | | processing speed (fps) | average peak signal-to-noise ratio(dB) | | |
|---|---|---|---|---|---|
| | | | Y | $C_r$ | $C_b$ |
| CPDT | bilinear | 8.5 | 25.94 | 30.05 | 28.42 |
| CPDT | 7-tap coefficient filter | 7.9 | 26.83 | 35.19 | 37.47 |
| CDDT | | 5.4(6.0) | 27.11 | 35.53 | 36.72 |
| computation reduction | first preferred embodiment | 9.0(10.0) | 27.11 | 35.53 | 36.72 |
| | second preferred embodiment | 10.1(11.5) | 26.85 | 34.52 | 36.31 |

("Flower-Garden")

| method \ experimental results | | processing speed (fps) | average peak signal-to-noise ratio(dB) | | |
|---|---|---|---|---|---|
| | | | Y | $C_r$ | $C_b$ |
| CPDT | bilinear | 7.0 | 22.41 | 28.17 | 28.15 |
| CPDT | 7-tap coefficient filter | 6.5 | 23.69 | 30.57 | 33.55 |
| CDDT | | 4.2(4.8) | 24.43 | 30.54 | 33.37 |
| computation reduction | first preferred embodiment | 7.1(8.0) | 24.43 | 30.54 | 33.37 |
| | second preferred embodiment | 8.2(9.5) | 24.37 | 30.60 | 33.42 |

("Train")

| method \ experimental results | | processing speed (fps) | average peak signal-to-noise ratio(dB) | | |
|---|---|---|---|---|---|
| | | | Y | $C_r$ | $C_b$ |
| CPDT | bilinear | 7.2 | 21.1 | 29.2 | 30.0 |
| CPDT | 7-tap coefficient filter | 6.6 | 21.7 | 29.9 | 30.9 |
| CDDT | | 3.7(4.2) | 22.2 | 30.2 | 31.3 |
| computation reduction | first preferred embodiment | 6.0(7.0) | 22.2 | 30.2 | 31.3 |
| | second preferred embodiment | 7.4(8.7) | 22.0 | 30.5 | 31.7 |

FIG. 10

|  | DCT-MCdec | DCT-MCenc |
|---|---|---|
| CDDT | 55.67% | 9.80% |
| first preferred embodiment | 33.19% | 15.34% |
| second preferred embodiment | 29.75% | 16.67% |

FIG. 11(a)

|  | DCT-MCdec | DCT-MCenc |
|---|---|---|
| CDDT | 57.63% | 10.71% |
| first preferred embodiment | 35.16% | 16.89% |
| second preferred embodiment | 27.93% | 19.48% |

FIG. 11(b)

LOW-COMPLEXITY SPATIAL DOWNSCALING VIDEO TRANSCODER AND METHOD THEREOF

FIELD OF THE INVENTION

The present invention generally relates to video transcoders in communication, and more specifically to a low-complexity spatial downscaling video transcoder and method thereof.

BACKGROUND OF THE INVENTION

The moving picture experts group (MPEG) developed a generic video compression standard that defines three types of frames, called Intra-frame (I-frame), predictive-frame (P-frame) and bi-directionally predictive frame (B-frame). A group of pictures (GOP) comprises an I-frame and a plural of P-frames and B-frames. FIG. 1 shows a GOP structure of (N,M) that comprises N frames and there are M B-frames between two I-frames or P-frames.

In recent years, due to the advances of network technologies and wide adoptions of video coding standards, digital video applications become increasingly popular in our daily life. Networked multimedia services, such as video on demand, video streaming, and distance learning, have been emerging in various network environments. These multimedia services usually use pre-encoded videos for transmission. The heterogeneity of present communication networks and user devices poses difficulties in delivering these bit-streams to the receivers. The sender may need to convert one preencoded bit-stream into a lower bit-rate or lower resolution version to fit the available channel bandwidths, the screen display resolutions, or even the processing powers of diverse clients. Many practical applications such as video conversions from DVD to VCD, i.e., MPEG-2 to MPEG-1, and from MPEG-1/2 to MPEG-4 involve such spatial-resolution, format, and bit-rate conversions. Dynamic bit-rate or resolution conversions may be achieved using the scalable coding schemes in current coding standards to support heterogeneous video communications. They, however, usually just provide a very limited support of heterogeneity of bit-rates and resolutions, e.g., MPEG-2 and H.263+, or introduce significantly higher complexity at the client decoder, e.g., MPEG-4 FGS.

Video transcoding is a process of converting a previously compressed video bit-stream into another bit-stream with a lower bit-rate, a different display format (e.g., downscaling), or a different coding method (e.g., the conversion between H.26x and MPEG-x, or adding error resilience), etc. It is considered an efficient means of achieving fine and dynamic adaptation of bit-rates, resolutions, and formats. In realizing transcoders, the computational complexity and picture quality are usually the two most important concerns.

A straightforward realization of video transcoders is the Cascaded Pixel-domain Downscaling Transcoder (CPDT) that cascades a decoder followed by an encoder as shown in FIG. 2. The computational complexity of the CPDT can be reduced by combining decoder and encoder, reusing the motion-vectors and coding-modes, and removing the motion estimation (ME) operation. This cascaded architecture is flexible and can be used for bit-rate adaptation, spatial and temporal resolution-conversion without drift. It is, however, computationally intensive for real-time applications, even though the motion-vectors and coding-modes of the incoming bit-stream can be reused for fast processing.

Recently, DCT-domain transcoding schemes have become very attractive because they can avoid the discrete cosine transform (DCT) and the inverse discrete cosine transform (IDCT) computations. Also, several efficient schemes were developed for implementing the DCT-domain motion compensation (DCT-MC). However, the conventional simplified DCT-domain transcoder cannot be used for spatial/temporal downscaling because it has to use the same motion vectors that are decoded from the incoming video at the encoding stage. The outgoing motion vectors usually are different from the incoming motion vectors in spatial/temporal downscaling applications.

The firstly proposed Cascaded DCT-domain Downscaling Transcoder (CDDT) architecture is depicted in FIG. 3, where a bilinear filtering scheme was used for downscaling the spatial resolution in the DCT domain. The decoder-loop of CDDT is operated at the full picture resolution, while the encoding is performed at the quarter resolution. The CDDT can avoid the DCT and IDCT computations required in the CPDT as well as preserve the flexibility of changing motion vectors, coding modes as in the CPDT. The major computation required in the CDDT is the DCT-MC operation, as shown in FIG. 4. It can be interpreted as computing the coefficients of the target DCT block B from the coefficients of its four neighboring DCT blocks, $B_i$, i=1 to 4, where $B=DCT(b)$ and $B_i=DCT(b_i)$ are the 8×8 DCT blocks of the associated pixel blocks b and $b_i$. A close-form solution to compute the DCT coefficients in the DCT-MC operation was firstly proposed as follows.

$$B = \sum_{i=1}^{4} H_{h_i} N_i H_{w_i} \qquad (1)$$

where $w_i$ and $h_i \in \{0,1, \ldots 7\}$. $H_{h_i}$ and $H_{w_i}$ are constant geometric transform matrices defined by the height and width of each sub-block generated by the intersection of $b_i$ with b.

It takes 8 matrix multiplications and 3 matrix additions to compute Eq. (1) directly. However, the following relationships of geometric transform matrices hold: $H_{h_1}=H_{h_2}$, $H_{h_3}=H_{h_4}$, $H_{w_1}=H_{w_3}$ and $H_{w_2}=H_{w_4}$. Usin computation of Eq. (1) can be reduced to 6 matrix multiplications and 3 matrix additions, as shown in Eq. (2) below.

$$B = H_{h_1}(N_1 H_{w_1} + N_2 H_{w_2}) + H_{h_3}(N_3 H_{w_3} + N_4 H_{w_4}) \qquad (2)$$

where $H_{h_i}$ and $H_{w_i}$ can be pre-computed and then pre-stored in a memory. Therefore, no additional DCT computation is required for the computation of Eq. (1) and Eq. (2). FIG. 4 shows the principle of the DCT-MC operation.

To reduce the computation of the DCT-MC, the number of matrix multiplications can be reduced from 24 to 18 by the conventional shared information method, while the number of matrix additions/subtractions is a bit increased. This leads to a computational reduction of about 25% in the DCT-MC operation.

A more efficient DCT-domain downscaling scheme, named DCT decimation, was then proposed for image downscaling and later adopted in video transcoding. This DCT decimation scheme extracts the 4×4 low-frequency DCT coefficients from the four original blocks $b_1$–$b_4$, then combines the four 4×4 sub-blocks into an 8×8 block. Let $B_1$, $B_2$, $B_3$, and $B_4$ represent the four original 8×8 DCT blocks; $\hat{B}_1$, $\hat{B}_2$, $\hat{B}_3$ and $\hat{B}_4$ the four 4×4 low-frequency sub-blocks of $B_1$, $B_2$, $B_3$, and $B_4$, respectively; $\hat{b}_i$=IDCT($\hat{B}_i$), i=1, . . . , 4. Then $$\hat{b} = \begin{bmatrix} \hat{b}_1 & \hat{b}_2 \\ \hat{b}_3 & \hat{b}_4 \end{bmatrix}_{8\times 8}$$

is the downscaled version of $$b = \begin{bmatrix} b_1 & b_2 \\ b_3 & b_4 \end{bmatrix}_{16\times 16}.$$

FIG. 5 illustrates the DCT decimation.

To compute $\hat{B}$=DCT($\hat{b}$) directly from $\hat{B}_1$, $\hat{B}_2$, $\hat{B}_3$, and $\hat{B}_4$, it can use the following expression:

$$\begin{aligned} \hat{B} &= T\hat{b}T^t \quad (3) \\ &= [T_L \quad T_R] \begin{bmatrix} T_4^t\hat{B}_1 T_4 & T_4^t\hat{B}_2 T_4 \\ T_4^t\hat{B}_3 T_4 & T_4^t\hat{B}_4 T_4 \end{bmatrix} \begin{bmatrix} T_L^t \\ T_R^t \end{bmatrix} \\ &= (T_L T_4^t)\hat{B}_1(T_L T_4^t)^t + (T_L T_4^t)\hat{B}_2(T_R T_4^t)^t + (T_R T_4^t)\hat{B}_3(T_L T_4^t)^t + \\ &\quad (T_R T_4^t)\hat{B}_4(T_R T_4^t)^t \end{aligned}$$

In addition, an architecture similar to the CDDT was proposed, where a reduced-size frame memory is used in the DCT-domain decoder loop for computation and memory reduction which may lead to some drifting errors.

SUMMARY OF THE INVENTION

The present invention has been made to overcome the above-mentioned drawback of conventional DCT-domain downscaling transcoder. The primary object of the present invention is to provide a low-complexity spatial downscaling video transcoder. The spatial downscaling video transcoder of the invention integrates the DCT-domain decoding and downscaling operations in the downscaling CDDT into a reduced-resolution DCT-MC so as to achieve significant reduction of computations without any quality degradation.

The spatial downscaling video transcoder of the invention comprises a decoder having a reduced DCT-MC unit, a DCT-domain downscaling unit, and an encoder. The decoder receives incoming bit-streams, uses the reduced DCT-MC unit to integrate the DCT-domain motion compensation and downscaling operations in the downscaling CDDT into a reduced-resolution DCT-MC for B or P frames in MPEG standard, performs the reduced-resolution decoding, generates an estimated motion vector, and performs the full-resolution decoding for I-frames in MPEG standard. After downscaling the decoded I-frames, the DCT-domain downscaling unit outputs the results for encoding. The encoder receives the estimated vector and the downscaling results from the DCT-domain downscaling unit, determines encoding modes and outputs encoded bit-streams.

The spatial downscaling video transcoder of the invention has two preferred embodiments. In the first preferred embodiment, the low-complexity operation performs the full-resolution decoding for I and P frames and the reduced-resolution decoding for B frames. When performing the DCT-MC downscaling for B-frames in the decoder-loop, only the low-frequency portions are extracted while I and P frames are decoded at the full picture resolution. In this way, for B-frames, only the reduced-resolution DCT-MC is required in the decoder-loop. Since B-frames usually occupy a large portion of an I-B-P structured MPEG video, the computation saving can be very significant.

In the second preferred embodiment of the invention, the low computational complexity is achieved by performing the reduced-resolution decoding for all B and P frames. Therefore, every block of P-frames has only nonzero low-frequency DCT coefficients and all high-frequency coefficients are discarded.

According to the architecture of the video transcoder, the spatial downscaling video transcoding method of the invention also provides an activity-weighted median filtering scheme for re-sampling motion vectors, and a scheme for determining the coding modes. The spatial downscaling video transcoding method of the invention mainly comprises the following steps: (a) receiving incoming bit-streams, using a reduced DCT-MC unit to integrate the DCT-domain motion compensation and downscaling operations in the downscaling CDDT into a reduced-resolution DCT-MC for B or P frames in MPEG standard, performing the reduced-resolution decoding, generating an estimated motion vector, and performing the full-resolution decoding for I-frames in MPEG standard; (b) after downscaling the decoded I-frames, outputting the results for encoding; (c) receiving the estimated vectors and the DCT-domain downscaling results as well as determining the encoding modes and outputting the encoded bit-stream.

This invention compares the average peak signal-to-noise ratio (PSNR) performance and processing speed of various transcoders. The luminance PSNR values of each frame are compared. The experimental results show that, as compared to the original CDDT, the first preferred embodiment of the invention can increase the processing speed over 60% without any quality degradation for videos with the (15,3) GOP structure. The second preferred embodiment of the invention can further increase the speed, while introducing below 0.3 dB quality degradation in the luminance component. By using the shared information approach, the processing speed of two preferred embodiments of the invention can be further improved without sacrificing the video quality.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 10 compares the average PSNR performance and processing speed of various transcoders.

FIG. 11a and FIG. 11b show percentage computational costs for the original CDDT and this invention in terms of DCT-MC$_{dec}$, DCT-MC$_{enc}$, and other modules with "Football" and "Flower-Garden" sequences, respectively;

DETAILED DESCRIPTION OF THE PREFERRED EMBODIMENTS

Figure 1:
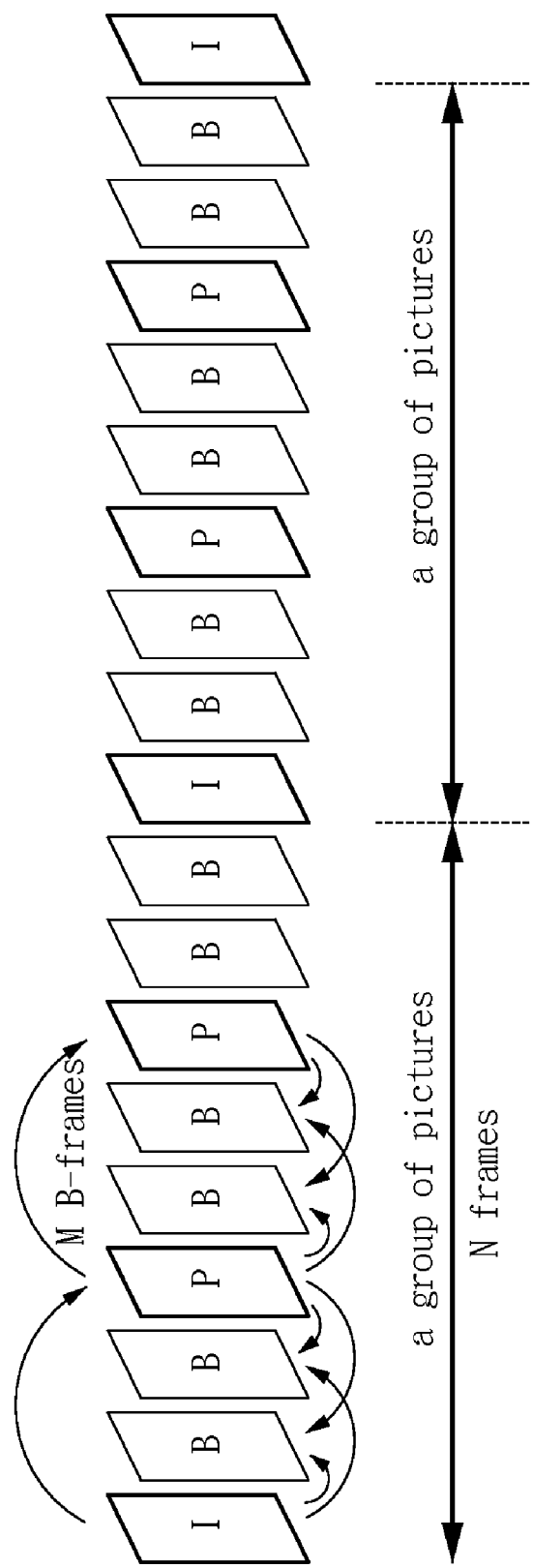
FIG. 1 shows a GOP structure of (N, M) in MPEG standard.
Figure 2:
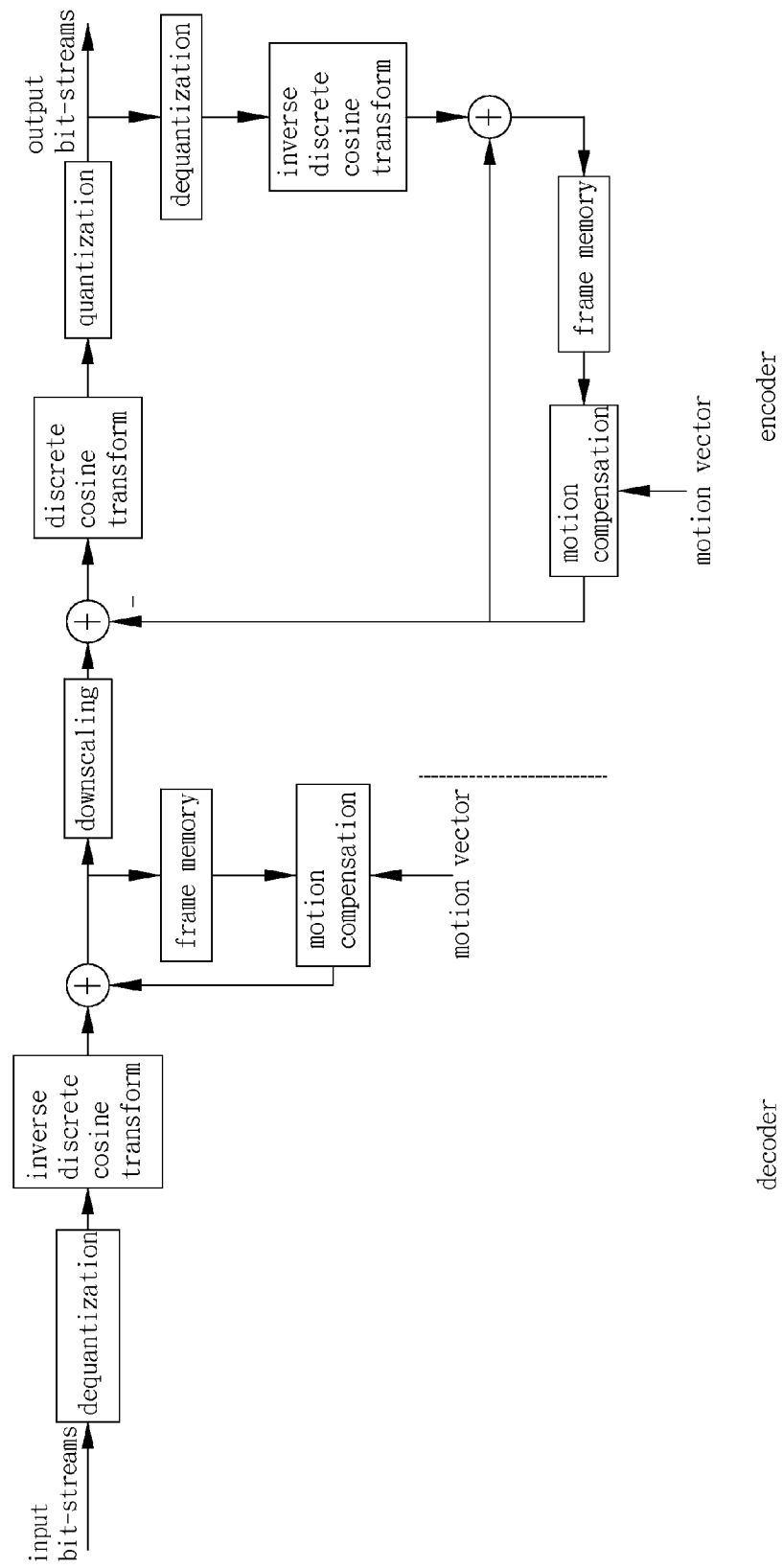
FIG. 2 shows a block diagram of a conventional Cascaded Pixel-domain Downscaling Transcoder.
Figure 3:
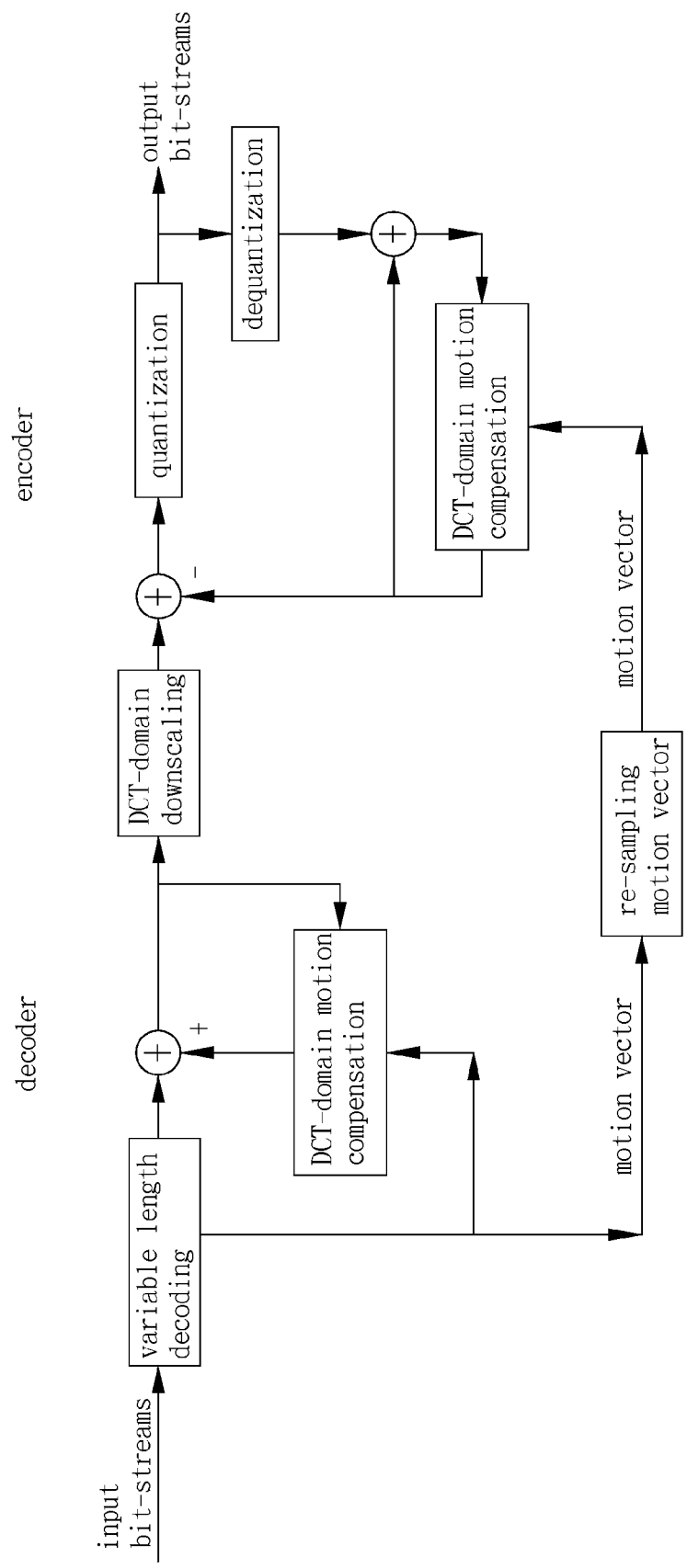
FIG. 3 shows a block diagram of a conventional Cascaded DCT-domain Downscaling Transcoder.
Figure 4:
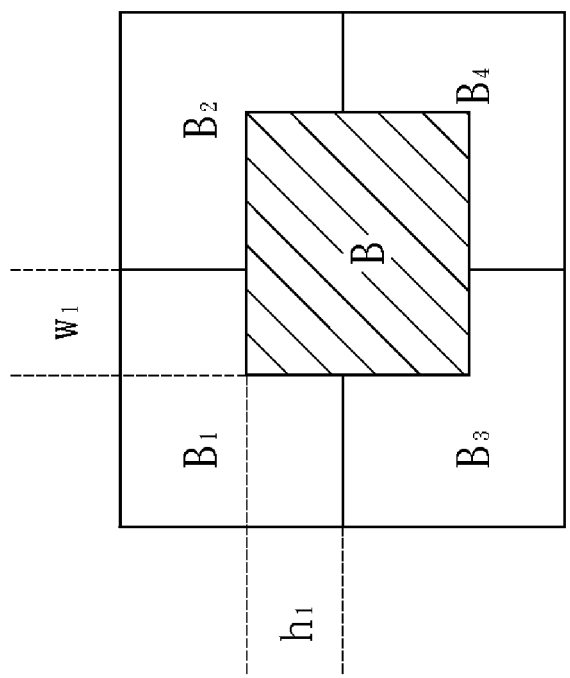
FIG. 4 shows the principle of the conventional DCT-MC operation.
Figure 5:
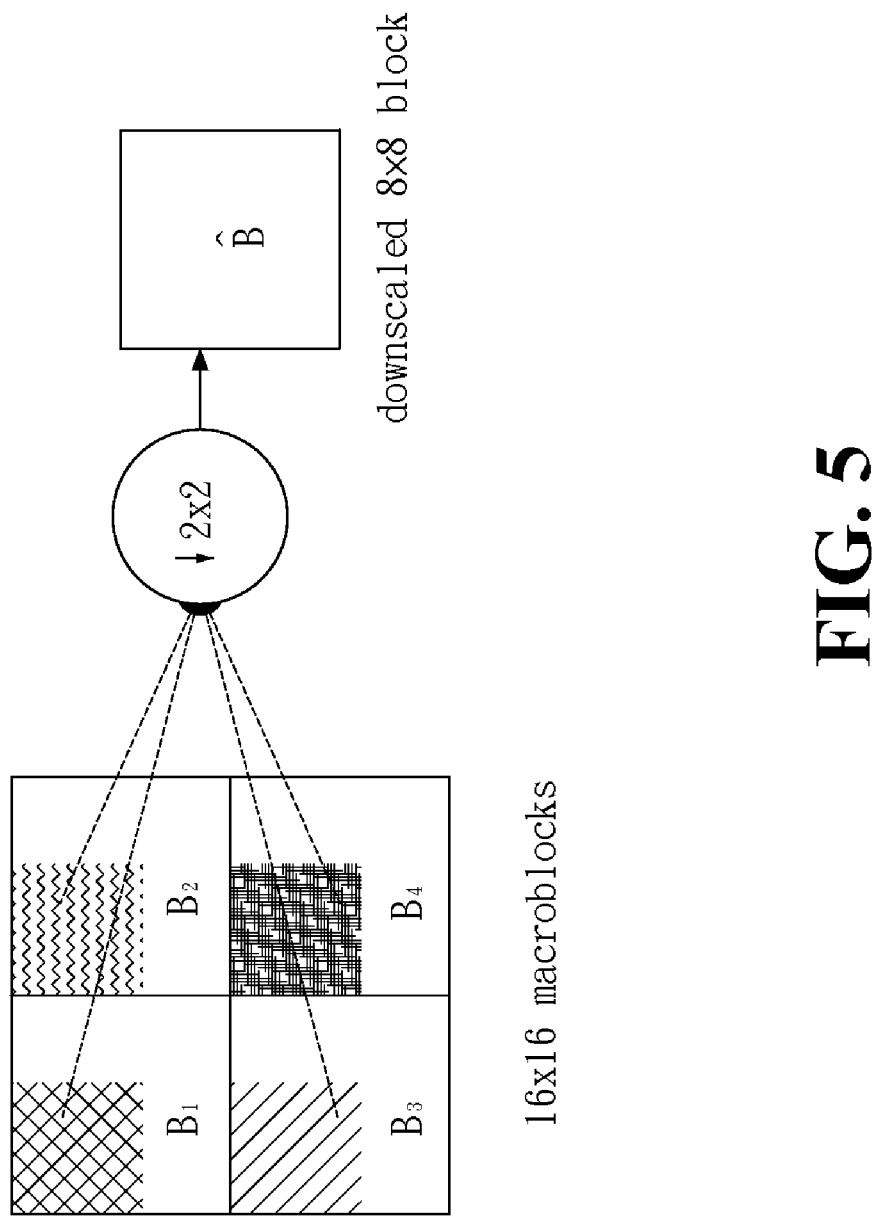
FIG. 5 illustrates the DCT decimation.
Figure 6:
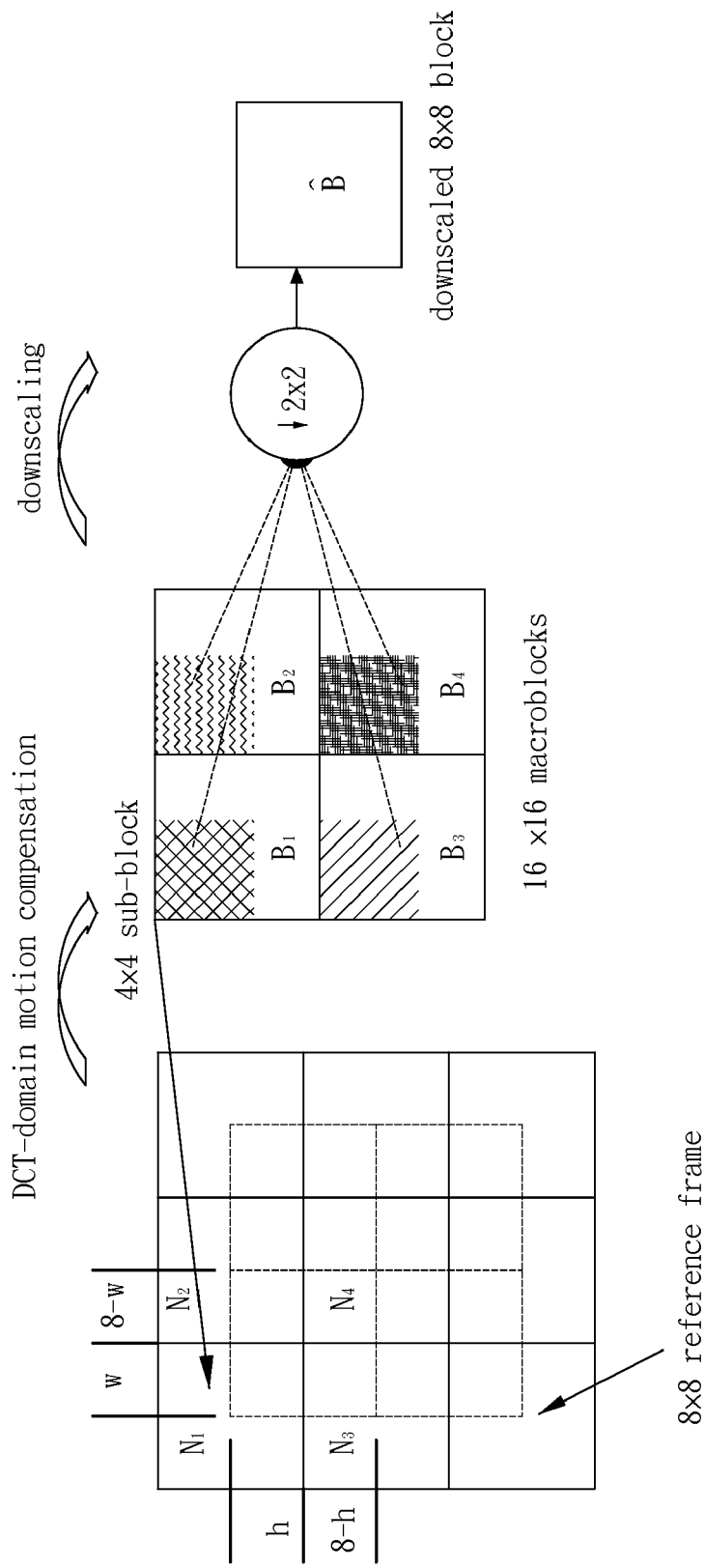
FIG. 6 shows exploiting only the 4×4 low-frequency DCT coefficients of each decoded bloc for downscaling after DCT-domain motion compensation.

The spatial downscaling video transcoder of the invention is used to reduce the computation by the conventional CDDT. The decoder-loop of the conventional CDDT is operated at the full picture resolution, while the encoding is performed at the quarter resolution. Instead of using the whole DCT coefficients decoded from the decoder loop, the DCT-domain downscaling scheme of the invention only exploits the low-frequency DCT coefficients of each decoded block for downscaling. FIG. 6 shows exploiting only the 4×4 low-frequency DCT coefficients of each decoded block for downscaling after DCT-domain motion compensation. For simplicity, all embodiments of the invention assume the horizontal and the vertical downscaling factors are 2. But, this invention can easily infer to a general $N_x \times N_y$ case of spatial downscaling, where $N_x$ and $N_y$ are respectively the horizontal and the vertical downscaling factors.

Figure 7:
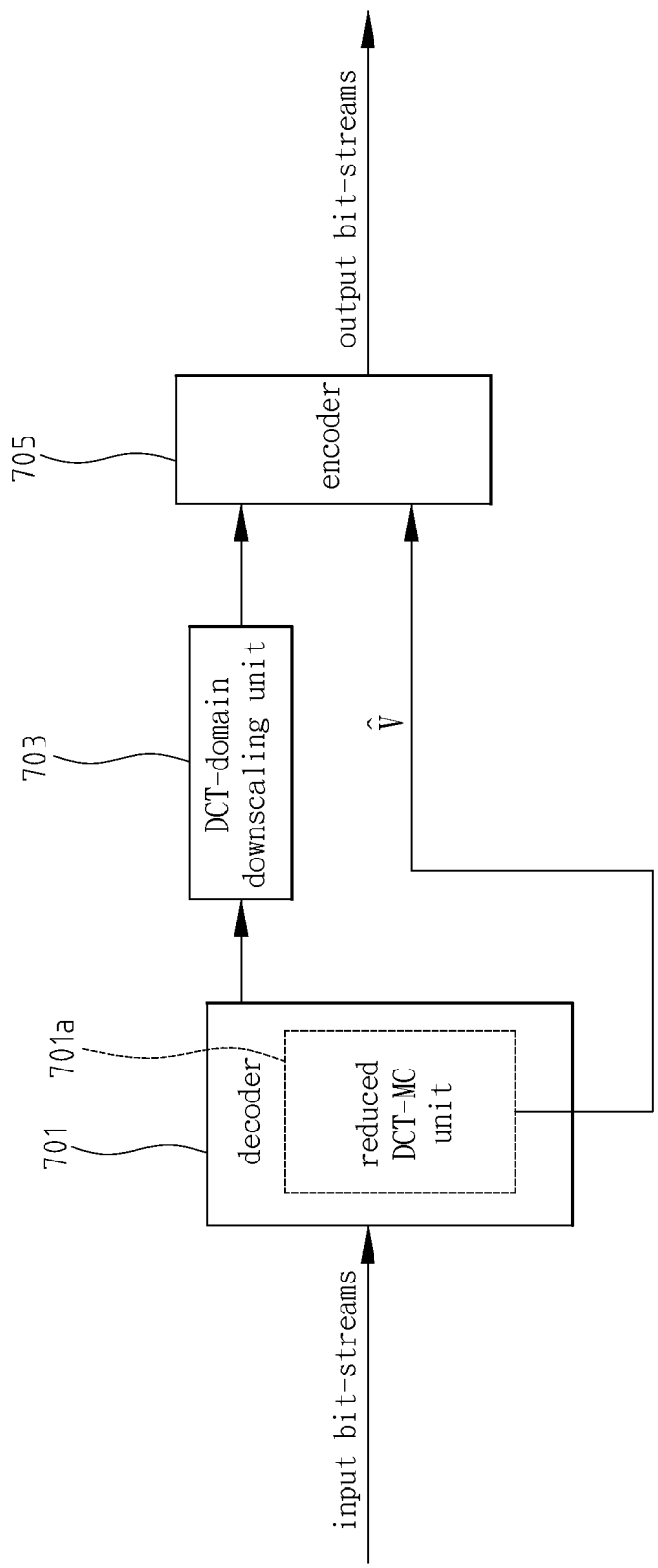
FIG. 7 shows a block diagram of a spatial downscaling video transcoder according to the invention.

FIG. 7 shows a block diagram of a spatial downscaling video transcoder of the invention. The spatial downscaling video transcoder comprises a decoder 701 having a reduced DCT-MC unit 701a, a DCT-domain downscaling unit 703, and an encoder 705. The decoder 701 receives incoming bit-streams, uses the reduced DCT-MC unit 701a to integrate the DCT-domain motion compensation and downscaling operations in the downscaling CDDT into a reduced-resolution DCT-MC for B or P frames in MPEG standard, performs the reduced-resolution decoding, generates an estimated motion vector $\hat{V}$, and performs the full-resolution decoding for I-frames in MPEG standard. After downscaling the decoded I-frames, the DCT-domain downscaling unit 703 outputs the results for encoding. The encoder 705 receives the estimated vector $\hat{V}$ and the downscaling results from the DCT-domain downscaling unit 703, then determines the encoding modes and outputs the encoded bit-stream.

Accordingly, the spatial downscaling video transcoding method of the invention mainly comprises the following steps: (a) receiving incoming bit-streams, using a reduced DCT-MC unit to integrate the DCT-domain motion compensation and downscaling operations in the downscaling CDDT into a reduced-resolution DCT-MC for B or P frames in MPEG standard, performing the reduced-resolution decoding, generating an estimated motion vector, and performing the full-resolution decoding for I-frames in MPEG standard; (b) after downscaling the decoded I-frames, outputting the results for encoding; (c) receiving the estimated vector and the DCT-domain downscaling results as well as determining encoding modes and outputting encoded bit-streams.

Figure 8:
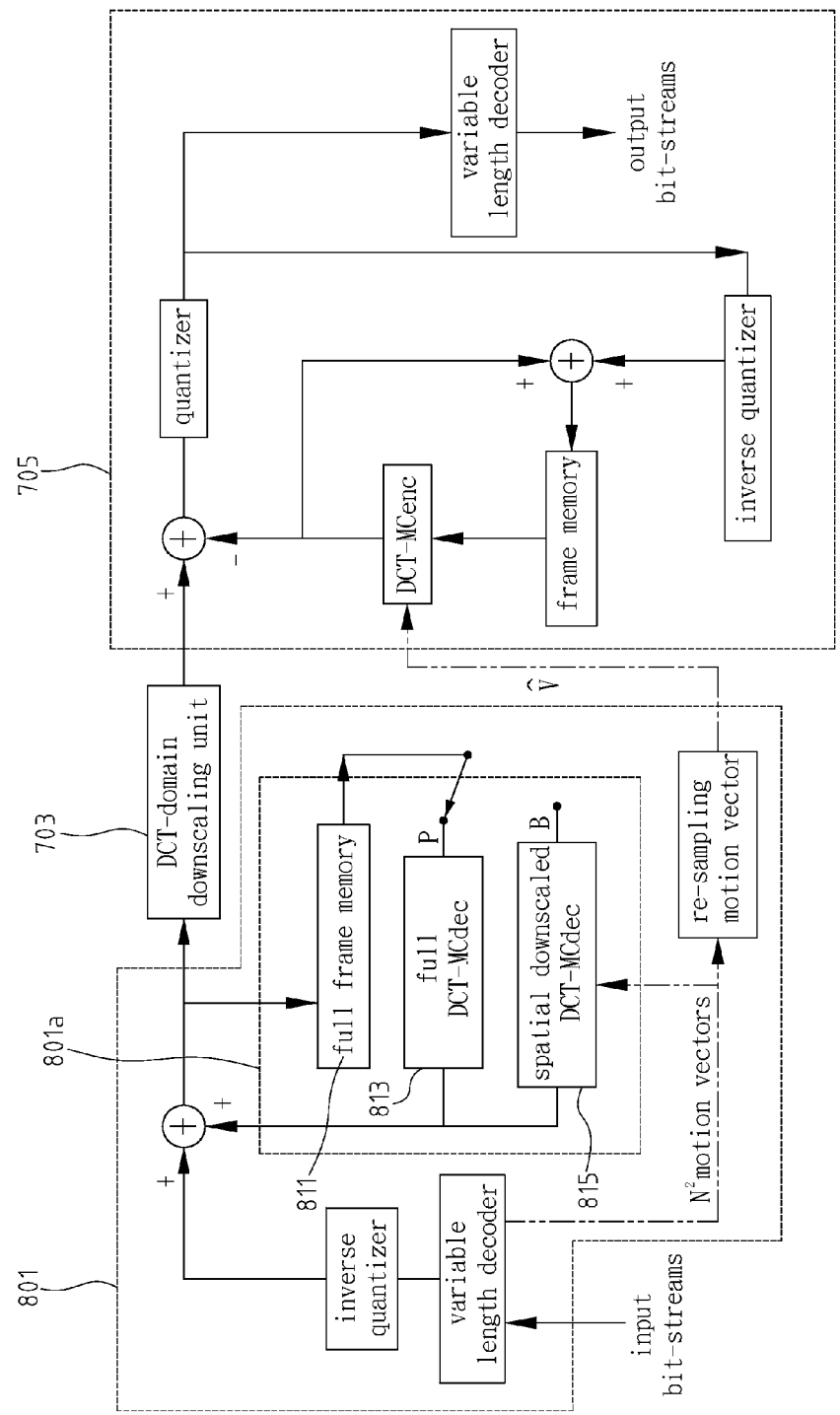
FIG. 8 shows a block diagram of the first preferred embodiment of the invention according to FIG. 7.

In the first preferred embodiment of the invention, the low-complexity operation performs the full-resolution decoding for I and P frames and the reduced-resolution decoding for B frames. FIG. 8 shows a block diagram of the first preferred embodiment of the invention. Referring to FIG. 8, when performing the DCT-MC downscaling in the decoder-loop, denoted by DCT-MC$_{dec}$, for B-frames, only the low-frequency coefficients are extracted while I and P frames are decoded at the full picture resolution. In this way, for B-frames, only the reduced-resolution DCT-MC is required in the decoder-loop. Since B-frames usually occupy a large portion of an I-B-P structured MPEG video, the computation saving can be very significant.

Therefore, in step (a) of the transcoding scheme depicted in the first preferred embodiment, when performing the DCT-MC downscaling for B-frames in the decoder-loop, only the low-frequency coefficients are extracted while I and P frames are decoded at the full picture resolution.

Accordingly, referring to FIG. 8 again, as usual decoders, the decoder 801 has not only a reduced DCT-MC unit 801a, but also a variable length decoder (VLD), an inverse quantizer and an adder. The reduced DCT-MC unit 801a comprises a full frame memory 811, a full DCT-MC$_{dec}$ 813, and a spatial downscaled DCT-MC$_{dec}$ 815. The full frame memory 811 saves decoded and inverse quantized incoming bit-streams or reconstructed frames of full resolution. The full DCT-MC$_{dec}$ 813 performs the discrete cosine transform and motion compensation of full resolution for P-frames. The spatial downscaled DCT-MC$_{dec}$ 815 performs the discrete cosine transform and motion compensation of reduced resolution for B-frames. As usual encoders, the encoder 705 comprises two adders, a quantizer, a variable length encoder (VLC), an inverse quantizer, a frame memory, and a DCT-MC$_{enc}$.

For simplicity, only one reference frame is used in the following to show the simplified DCT-MC for decoding B-frames. It can be easily extended toe the case with bidirectional prediction. By incorparating the DCT decimation into the DCT-MC of the decoder-loop for B frames, the following equation holds:

$$\hat{B}_1 = P_4 \left( \sum_{i=1}^{4} H_{h_i} N_i H_{w_i} \right) P_4^t \quad (4)$$

$$= \sum_{i=1}^{4} (P_4 H_{h_i} N_i H_{w_i} P_4^t)$$

$$= \sum_{i=1}^{4} \left\{ [H_{h_i}^{11} \; H_{h_i}^{12}] \begin{bmatrix} N_i^{11} & N_i^{12} \\ N_i^{21} & N_i^{22} \end{bmatrix} \begin{bmatrix} H_{w_i}^{11} \\ H_{w_i}^{21} \end{bmatrix} \right\}$$

$$= \sum_{i=1}^{4} \{ (H_{h_i}^{11} N_i^{11} + H_{h_i}^{12} N_i^{21}) H_{w_i}^{11} + (H_{h_i}^{11} N_i^{12} + H_{h_i}^{12} N_i^{22}) H_{w_i}^{21} \}$$

where $$P_4 = \begin{bmatrix} I_4 & 0 \\ 0 & 0 \end{bmatrix},$$

$I_4$ is a 4×4 unit matrix, and 0 is a 4×4 zero matrix, then Eq. (4) becomes $$P_4 H_{h_i} B_i H_{w_i} P_4^t = (H_{h_i}^{11} N_i^{11} + H_{h_i}^{12} N_i^{21}) H_{w_i}^{11} + (H_{h_i}^{11} N_i^{12} + H_{h_i}^{12} N_i^{22}) H_{w_i}^{21} \quad (5)$$

It is worthy to mention that all matrices in Eq. (5) are 4×4 matrices. Therefore, if B-frames are decoded with quarter resolution, then it takes $6 \times 4^3$ multiplications and 21×42 additions for Eq. (5). While for Eq (1), it takes $2 \times 8^3$ multiplications and 14×82 additions. Therefore, the number of multiplication operations reduces about 60% in DCT-$MC_{dec}$. Furthermore, coding block $N_i$ usually has many zero high-frequency coefficients. Therefore, this scheme has fewer computations than the number of computations mentioned above. Also, by the symmetric property of geometric transform matrices, that is $H_{h_1} = H_{h_2}$, $H_{h_3} = H_{h_4}$, $H_{w_1} = H_{w_3}$, and $H_{w_2} = H_{w_4}$, Eq. (4) can be written to $$\hat{B}_1 = H_{h_1}^{11} (N_1^{11} H_{w_1}^{11} + N_1^{12} H_{w_2}^{11} + N_2^{11} H_{w_1}^{21} + N_2^{12} H_{w_2}^{21}) + H_{h_1}^{12} (N_1^{21} H_{w_1}^{11} + N_1^{22} H_{w_2}^{11} + N_2^{21} H_{w_1}^{21} + N_2^{22} H_{w_2}^{21})$$

$$+ H_{h_3}^{11} (N_3^{11} H_{w_1}^{11} + N_3^{12} H_{w_2}^{11} + N_4^{11} H_{w_1}^{21} + N_4^{12} H_{w_2}^{21}) + H_{h_3}^{12} (N_3^{21} H_{w_1}^{11} + N_3^{22} H_{w_2}^{11} + N_4^{21} H_{w_1}^{21} + N_4^{22} H_{w_2}^{21}) \quad (6)$$

Eq. (6) needs 20 4×4-matrix multiplications and 15 4×4-matrix additions, while it takes 6 8×8-matrix multiplications and 3 8×8-matrix additions for Eq (2). It is worthy to mention that, although B-frames are decoded with the quarter resolution, the performance is the same as that of the original CDDT. Therefore, the architecture of the first preferred embodiment of this invention does not induce any quality degradation.

The computation can be further reduced by applying the quarter-resolution decoding for all P and B-frames. In this way, each block of the reference P-frame has only 4×4 nonzero low-frequency DCT coefficients (i.e., B12, B21, and B22 in (4) are all zero matrices), (4) can thus be reduced as $$\hat{B}_1 = \sum_{i=1}^{4} H_{h_i}^{11} B_i^{11} H_{w_i}^{11} \quad (7)$$

$$= H_{h_1}^{11} (B_1^{11} H_{w_1}^{11} + B_2^{11} H_{w_2}^{11}) + H_{h_3}^{11} (B_3^{11} H_{w_3}^{11} + B_4^{11} H_{w_4}^{11})$$

Figure 9:
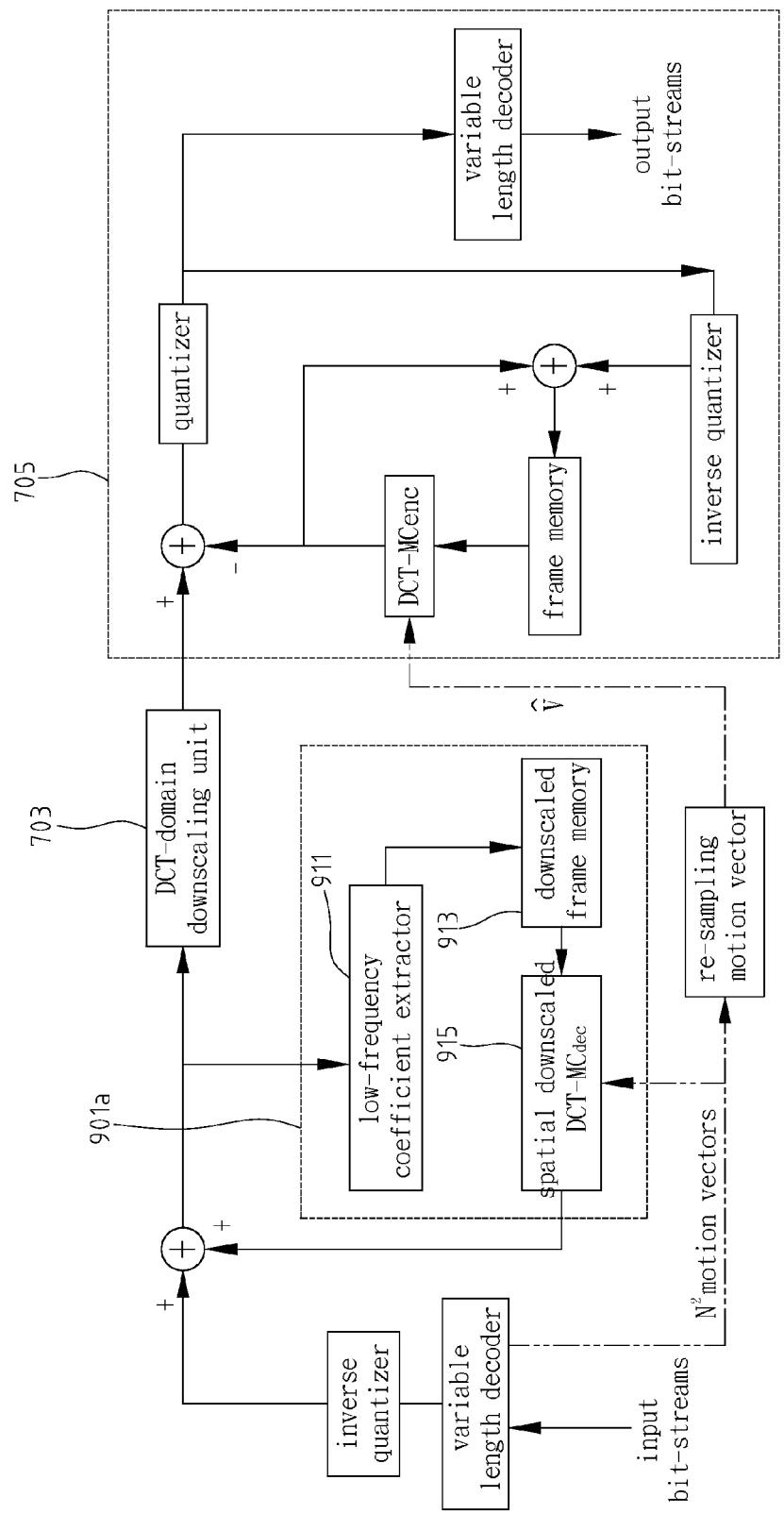
FIG. 9 shows a block diagram of the second preferred embodiment of the invention according to FIG. 7.

FIG. 9 shows a block diagram of the second preferred embodiment of the invention. Referring to FIG. 9, when performing the DCT-MC downscaling DCT-$MC_{dec}$ in the decoder-loop for B-frames and P-frames, only the low-frequency coefficients are extracted while I-frames are decoded at the full picture resolution. In this way, the reduced DCT-MC unit 901a in the second preferred embodiment shown in FIG. 9 comprises a low-frequency coefficient extractor 911, a downscaled frame memory 913, and a spatial downscaled DCT-$MC_{dec}$ 915. The downscaled frame memory 913 saves decoded and inverse quantized incoming bit-streams or reconstructed frames of downscaled resolution. The low-frequency coefficient extractor 911 extracts the low-frequency coefficients of incoming data from the downscaled frame memory 913. The spatial downscaled DCT-$MC_{dec}$ 915 performs the downscaling and motion compensation of reduced resolution for B-frames and P-frames.

Therefore, in step (a) of the transcoding method of the second preferred embodiment, the decoder-loop extracts only the low-frequency portions when performing the DCT-MC downscaling for B-frames and P-frames while I-frames are decoded at the full picture resolution.

After the downscaling, the motion vectors need to be re-sampled to obtain a correct value. Full-range motion re-estimation is computationally too expensive, thus not suited to practical applications. Several conventional methods were proposed for fast re-sampling the motion vectors based on the motion information of the incoming frame. Three conventional motion vector re-sampling methods were compared: median filtering, averaging, and majority voting, where the median filtering scheme was shown to outperform the other two. For a reduced $N_x \times N_y$ system, original $N_x \times N_y$ macroblocks can be reduced to one macroblock. As a generation of median filtering scheme, this invention uses the activity-weighted median of the $N_x \times N_y$ incoming vector set $V = \{v_1, v_2, \ldots, v_{N_x \times N_y}\}$ as follows:

$$v = \frac{1}{N_{x/y}} \operatorname*{argmin}_{v_i \in V} \frac{1}{ACT_i} \sum_{\substack{j=1 \\ j \neq i}}^{N_x \times N_y} \|v_i - v_j\|$$

where v is the new motion vector of the reduced macroblock (MB), $N_x$ is the horizontal downscaling factor of the motion vector, and $N_y$ is the vertical downscaling factor of the motion vector. The macroblock activity $ACT_i$ can be the squared or absolute sum of DCT coefficients, the number of nonzero DCT coefficients, or simply the DC value. This invention adopts the squared sum of DCT coefficients of MB as the activity measure.

The MB coding modes also need to be re-determined after the downscaling. In the invention, the rules for determining the coding modes of the invention are as follows:

(1) If all the four original MBs are intra-coded, then the mode for the downscaled MB is set as intra-coded.
(2) If all the four original MBs are skipped, the resulting downscaled MB will also be skipped.
(3) In all other cases, the mode for the downscaled MB is set as inter-coded.

Note that, the motion vectors of skipped MBs are set to zero

FIG. 10 compares the average PSNR performance and processing speed of various transcoders. The luminance PSNR values of each frame are compared. The experimental results show that, as compared to the original CDDT, the first preferred embodiment of the invention can increase the processing speed up to 67% ("Football"), 69% ("Flower-Garden") and 62%("Train") without any quality degradation for videos with the (15,3) GOP structure. The second preferred embodiment of the invention can further increase the speed, while introducing about 0.25 dB quality degradation with "Football", 0.06 dB degradation with "Flower-Garden" and 0.2 dB degradation with "Train" in the luminance component. By using the shared information approach, the processing speed of two preferred embodiments of the invention can be further improved without sacrificing the video quality.

The speed-up gain is dependent on the GOP structure and size used. The larger the number of B-frames in a GOP, the higher the performance gain of the first preferred embodiment of the invention, while the speed-up gain of the second preferred embodiment of the invention depends on the number of P- and B-frames in a GOP. By using the shared information approach, the processing speed (the parenthesized values in FIG. 10) of the DCT-domain Transcoder of the invention can be further improved up to 10–15%. The experimental results show that, as compared to the cascaded pixel-domain downscaling transcoder using 7-tap filter, this invention gets higher performance with PSNR value about 0.3–0.8 db and faster processing speed to three test sequences.

FIG. 11a and FIG. 11b show percentage computational costs for the original CDDT and this invention in terms of $DCT\text{-}MC_{dec}$, $DCT\text{-}MC_{enc}$, and other modules (including DCT-domain downscaling, quantizing, inverse quantizing, variable length decoding and encoding) with "Football" and "Flower-Garden" sequences, respectively. Referring to these two figures, the original CDDT takes about 56–58% on the computation of $DCT\text{-}MC_{dec}$ module. However, the first embodiment of the invention can reduce 33–35% on the computation of $DCT\text{-}MC_{dec}$ module and the second embodiment of the invention can reduce 28–30%. This significant reduction of computations proves the performance and efficiency of the invention.

In summary, this invention provides efficient architectures for DCT-domain spatial-downscaling video transcoders. Methods for realizing the invention include providing an activity-weighted median filtering scheme for re-sampling motion vectors, and a method for determining the coding modes. Two embodiments of the invention integrate the DCT-domain decoding and downscaling operations in the downscaling CDDT into a reduced-resolution DCT-MC so as to achieve significant reduction of computations. The first embodiment of the invention can speed up the decoding and downscaling of B-frames without sacrificing the visual quality, while the second embodiment can speed up the decoding and downscaling of P- and B-frames with acceptable quality degradation. By using the shared information approach, the processing speed of the DCT-domain Transcoder of the invention can be further improved.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A low-complexity spatial downscaling video transcoder, comprising:
   a decoder having a reduced discrete cosine transform motion compensation (DCT-MC) unit, said decoder receiving incoming bit-streams, using said reduced DCT-MC unit to integrate DCT-domain motion compensation and downscaling operations into a reduced-resolution DCT-MC for B or P frames in MPEG standard, performing reduced-resolution decoding, generating an estimated motion vector, and performing full-resolution decoding for I-frames in MPEG standard;
   a DCT-domain downscaling unit outputting downscaling results of the decoded I-frames for encoding; and
   an encoder receiving said estimated motion vector and the downscaling results from said DCT-domain downscaling unit, determining encoding modes and outputting encoded bit-streams.

2. The low-complexity spatial downscaling video transcoder as claimed in claim 1, wherein said decoder performs full-resolution decoding for all I and P frames and reduced-resolution decoding for all B frames.

3. The low-complexity spatial downscaling video transcoder as claimed in claim 1, wherein said decoder performs reduced-resolution decoding for all P and B frames.

4. The low-complexity spatial downscaling video transcoder as claimed in claim 2, wherein said decoder extracts only low-frequency coefficients for performing the DCT-MC downscaling operation for B-frames.

5. The low-complexity spatial downscaling video transcoder as claimed in claim 3, wherein said decoder extracts only low-frequency coefficients for performing the DCT-MC downscaling operation all P-frames and B-frames.

6. The low-complexity spatial downscaling video transcoder as claimed in claim 1, wherein said reduced-resolution decoding is performed by decoding with a quarter resolution.

7. The low-complexity spatial downscaling video transcoder as claimed in claim 2, said reduced DCT-MC unit further comprising:
   a full frame memory, saving decoded and inverse quantized incoming bit-streams or reconstructed frames of downscaled resolution;
   a full $DCT\text{-}MC_{dec}$, performing discrete cosine transform and motion compensation of full resolution for P-frames; and
   a spatial downscaled $DCT\text{-}MC_{dec}$, performing discrete cosine transform and motion compensation of reduced resolution for B-frames.

8. The low-complexity spatial downscaling video transcoder as claimed in claim 3, said reduced DCT-MC unit further comprising:
   a downscaled frame memory, saving decoded and inverse quantized incoming bit-streams or reconstructed frames of downscaled resolution;
   a low-frequency coefficient extractor, extracting the low-frequency coefficients of incoming data from said downscaled frame memory; and
   a spatial downscaled $DCT\text{-}MC_{dec}$, performing downscaling and motion compensation of reduced resolution for B-frames and P-frames.

9. A low-complexity spatial downscaling video transcoding method, comprises the following steps:
   (a) receiving incoming bit-streams, using a reduced discrete cosine transform motion compensation (DCT-MC) unit to integrate DCT-domain motion compensation and downscaling operations into a reduced-resolution DCT-MC for B or P frames in MPEG standard, performing reduced-resolution decoding, generating an estimated motion vector, and performing full-resolution decoding for I-frames in MPEG standard;
   (b) outputting downscaling results of the decoded I-frames for encoding; and
   (c) receiving said estimated motion vector and the downscaling results from said DCT-domain downscaling unit, determining encoding modes and outputting encoded bit-streams.

10. The low-complexity spatial downscaling video transcoding method as claimed in claim 9, wherein said B frames are decoded by extracting only low-frequency coefficients for performing the DCT-MC downscaling operation in said step (a), while said I and P frames are decoded at a full picture resolution.

11. The low-complexity spatial downscaling video transcoding method as claimed in claim 9, wherein said B and P frames are decoded by extracting only low-frequency coefficients for performing the DCT-MC downscaling operation in said step (a), while said I frames are decoded at a full picture resolution.

12. The low-complexity spatial downscaling video transcoding method as claimed in claim 9, wherein a re-sampling process is further included for motion vectors after said DCT-domain motion compensation operation.

13. The low-complexity spatial downscaling video transcoding method as claimed in claim 12, wherein said re-sampling process is as follows:

for a reduced $N_x \times N_y$ system, original $N_x \times N_y$ macroblocks (MBs) are reduced to one macroblock, and the re-sampled motion vector is the activity-weighted median of $N_x \times N_y$ incoming vector set $V = \{v_1, v_2, \ldots, v_{N_x \times N_y}\}$.

14. The low-complexity spatial downscaling video transcoding method as claimed in claim 9, wherein for a reduced $N_x \times N_y$ system, original $N_x \times N_y$ macroblocks are reduced to one macroblock, then the rules for determining the coding modes in said step (c) are as follows:

(c1) If all original macroblocks are intra-coded, then the mode for the reduced macroblock is set as intra-coded;

(c2) If all original macroblocks are skipped, the reduced macroblock is also skipped; and (c3) The mode for the reduced macroblock is set as inter-coded in all other cases.

15. The low-complexity spatial downscaling video transcoding method as claimed in claim 13, wherein the squared sum of DCT coefficients of said macroblocks is adopted as the measurement of said motion vector.

16. The low-complexity spatial downscaling video transcoding method as claimed in claim 10, wherein said B frames are decoded with a quarter resolution.

17. The low-complexity spatial downscaling video transcoding method as claimed in claim 11, wherein said all P and B frames are decoded with a quarter resolution.

* * * * *